Oct. 7, 1952 — H. V. JOYCE — 2,612,829
VEHICULAR HEATER
Filed May 5, 1948 — 3 Sheets-Sheet 1

HAROLD V. JOYCE
INVENTOR.

BY E. C. McRae
J. R. Faulkner
T. H. Oster
ATTORNEYS

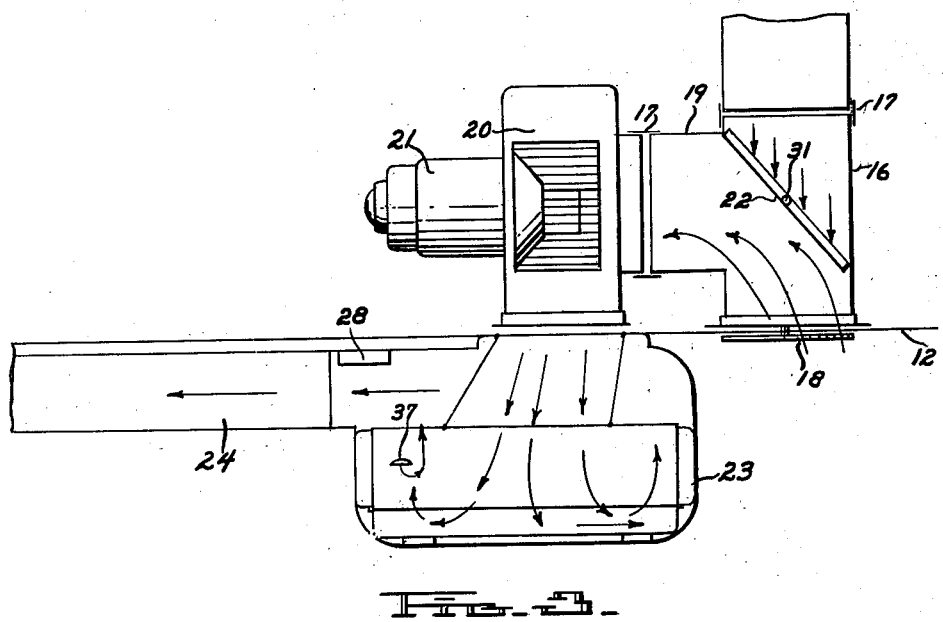
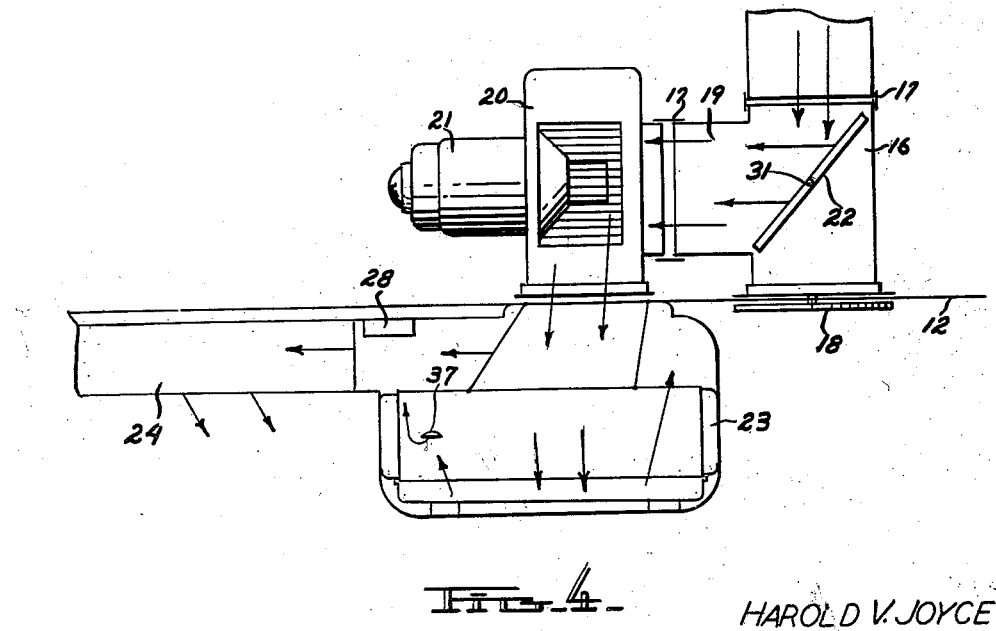

Oct. 7, 1952      H. V. JOYCE      2,612,829
VEHICULAR HEATER

Filed May 5, 1948      3 Sheets-Sheet 3

HAROLD V. JOYCE
INVENTOR.

BY E.C. McRae
J. P. Faulkner
G. H. Oster
ATTORNEYS

Patented Oct. 7, 1952

2,612,829

UNITED STATES PATENT OFFICE 2,612,829

VEHICULAR HEATER

Harold V. Joyce, Detroit, Mich., assignor to Ford Motor Company, Dearborn, Mich., a corporation of Delaware Application May 5, 1948, Serial No. 25,175

1 Claim. (Cl. 98—2)

This invention is concerned with a system for heating vehicles, and more particularly with a method and apparatus for heating automotive equipment which equipment is propelled by a water-cooled internal-combustion engine. It has long been common practice to employ the heat dissipated by the cooling water of such an internal-combustion engine to warm the vehicle in which the engine is mounted. This invention is, however, more particularly concerned with improvements in such a heating system whereby the operator of the vehicle can readily secure any desired temperature in the passenger compartment of the vehicle and can maintain such temperature despite variations in speed and loading of the vehicle and in the ambient weather conditions.

Because of the peculiar conditions obtaining in vehicular bodies, the proper heating and ventilation of such bodies, particularly in severe weather has posed a very troublesome problem. The problem of accurately regulating the temperature of the passenger compartment is complicated by such factors as the wide variations in the amount of heat given off from the passengers themselves, the variations in the temperature of the water which is used as a source of heat, the variations in the force and direction of air movement around the automobile body, changes in outside temperature and the differing degrees of weather tightness found from body to body and even in the same body as it ages.

The mere obtainment of the proper temperature in the passenger compartment during cold weather is only one end which must be attained by a satisfactory heating and ventilating system. Such a system must also serve to regulate to some extent the relative humidity in the passenger compartment to avoid the fogging or frosting of the window area which is inevitable in most weather if the relative humidity of the passenger compartment is permitted to become too high. A satisfactory system must also provide for the admission of controlled amounts of fresh air, free from surplus moisture and road dust at all seasons of the year.

With these and other objects in view, the invention comprises the arrangement, construction and combination of the various elements of the structure described in the specification, claimed in the claims and illustrated in the accompanying drawings in which:

Figure 3 is a view similar to Figure 2 except that the position of the butterfly valve has been changed to a position giving total recirculation of air.

Figure 4 is a view also similar to Figure 2 and differs therefrom in that the butterfly valve is set to provide for no recirculation of air.

Figure 1:
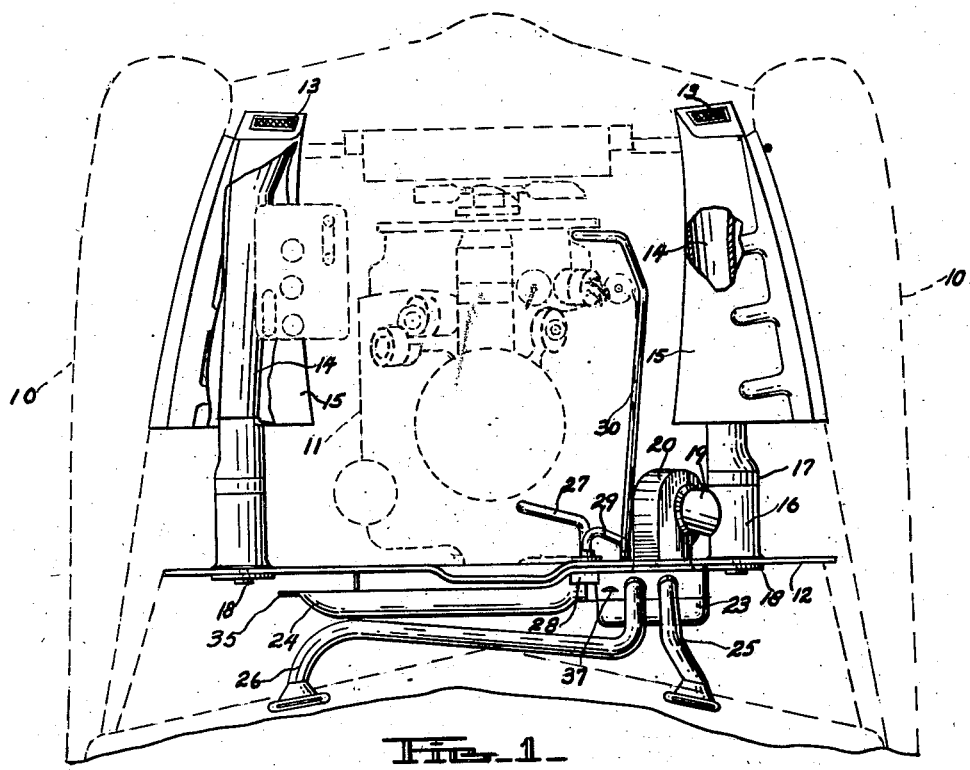
Figure 1 is a somewhat diagrammatic plan view of the forward portion of a vehicle in which the heating and ventilating system herein described has been installed.

Figure 1 is a somewhat diagrammatic plan view of the forward portion of a vehicle in which applicant's heating and ventilating system has been installed. In this figure of drawings the outline of the front fenders is indicated at 10 and the outline of the power plant at 11. The firewall which divides the passenger compartment from the engine compartment is shown at 12. At the forward end of the car, openings 13 are provided for the admittance of outside air to the heating and ventilating system. The air admitted through openings 13 passes rearwardly along conduits 14 which are contained in shield 15 which may be formed as an integral part of fenders 10. The rearward ends of conduit 14 are connected to the forward end of butterfly valve 16 by means of rubber sleeve 17. Air entering butterfly valve 16 may at certain times proceed directly to the rear and enter the passenger compartment by flowing past deflectors 18.

The air entering the passenger compartment through the left-hand deflector 18 is not heated air and serves no purpose other than providing fresh cool air to the interior of the car. The air entering right-hand conduit 14 can by a proper setting of butterfly 22 be permitted to flow directly into the passenger compartment past right-hand deflector 18 or deflected to the left through side arm 19 and into blower 20 which is operated by motor 21. Blower 20 serves to propel air into heater body 23 wherein it is heated by passage over a divided copper core served with hot water from the radiator. This copper core is constructed so that the air being heated blows forward through the central portion and backward through the end portions and emerges to the rear. This heated air is then blown into plenum 24 from which it emerges directly into the passenger compartment. This plenum 24 is provided along its lower edge with a series of openings not shown but designed to uniformly distribute the heated air along the width of the car. The end of this plenum is also provided with a slot 35 to propel heated air in the direction of the feet of the operator of the vehicle. Tubes 25 and 26 are provided to conduct heated air from the core to the windshield for defrosting purposes. If desired, the flow of air through tubes 25 and 26 may be regulated by separate butterfly valves.

Figure 2:
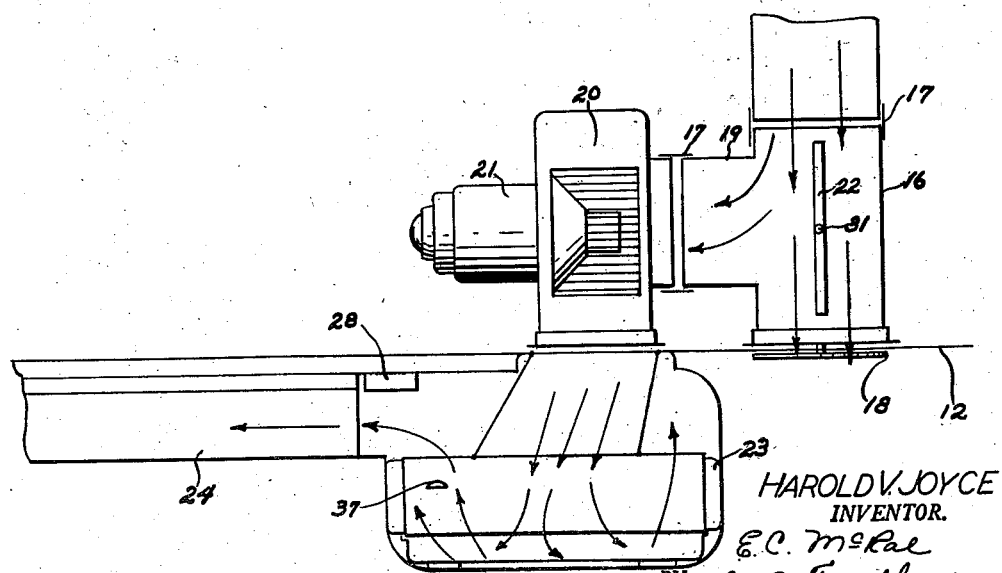
Figure 2 is a plan view of a portion of this heating and ventilating system showing an enlarged view of the butterfly valve and blower employed to control the flow of air.

The action and function of butterfly valves 16 are probably best understood from a simultaneous study of Figures 2, 3, and 4 of the drawings, each of which shows this butterfly valve in section. When it is desired to heat the interior of the vehicle, the operator can set butterfly 22 so that all of the air blown by blower 20 is drawn from the interior of the car recirculated through the heater or this butterfly may be adjusted so that all of the air passing through the blower 20 is drawn from the outside through conduit 14 or it may be adjusted to any intermediate position which will result in a portion of the air being drawn from the outside and a portion of it being recirculated. In Figure 2 the butterfly 22 is arranged with its plane parallel to the longitudinal axis of the vehicle. In this position and with the blower turned on and the car in motion, the air introduced through conduit 14 will be divided, a portion of such air passing through the blower 20, becoming heated in heater body 23 and entering the passenger compartment through plenum 24. Another portion of this air will not go into the heater but will go directly into the passenger compartment at deflector 18. It will be observed that exact portions of the air flowing in each direction will be somewhat dependent upon the effect of the ram action imparted to the air entering conduit 14 by virtue of the velocity of the vehicle. When the vehicle is at rest, it is apparent that with the butterfly 22 in the position shown in Figure 2, there will be some recirculation of the air from the passenger compartment to the blower through deflector 18. At high speeds this type of recirculation will decrease in amount or totally disappear.

In very severe weather or when the maximum rate of heating is desired, the butterfly 22 will be set in the position shown in Figure 3. In this position the air entering through right-hand conduit 14 is shut off from the passenger compartment by the butterfly 22 and the only air available to blower 20 is that drawn in from the passenger compartment past deflector 18 as shown by the arrows. In this way the air in the interior of the passenger compartment is recirculated past the heater and results in a rapid elevation of the temperature in the passenger compartment.

In mild weather or when a lesser amount of heat is needed or where it is desired to reduce the relative humidity in the interior of the passenger compartment to eliminate fogging or frosting of the interior surfaces of the windows, the butterfly 22 is set in the position shown in Figure 4 of the drawing. When the butterfly 22 is in this position all of the air entering the passenger compartment from blower 20 and through heater 23 and plenum 24 comes directly from the exterior albeit it is heated in its passage through the heater.

The tightness with which the modern automobile body is constructed has made it possible and almost necessary to automatically control the amount of heat imparted to the body by a heater. In the structure of the present invention, this regulation is accomplished by a thermostatic element. Reverting to Figure 1 the hot water employed as a source of heat is derived from the cylinder head through hose 27 and is led by this hose into thermostat 28. Thermostat 28 is an automatic arrangement whereby the water flowing through the thermostat and hence through the heater is controlled in response to the temperature existing in the passenger compartment. This thermostatic control is regulatable to suit the desires of the operator of the vehicle. The water passing through the thermostat enters hose 29 and is conducted into and through the heater core housed in heater body 23. After its passage through the heater core, it is discharged through hose 30 to another portion of the engine cooling system. Since thermostat 28 must for structural reasons be secured to the firewall 12, it does not reflect the true temperature within the vehicle body since it is somewhat isolated from the stream of hot air directed downwardly and to the left by plenum 24. To correct this condition the heater body 23 has an ear 37 punched out on its upperside, and in direct communication with the highly heated air passing over the core within heater body 23. This heated air blows out of heater body 23 through the ear 37 and is directed against thermostat 28. By judiciously choosing the size and location of ear 37 and the relative location of ear 37 and thermostat 28, it is possible to make thermostat 28 accurately reflect the temperature conditions inside the vehicle body, albeit its location ordinarily would not permit it to do so.

Figure 5:
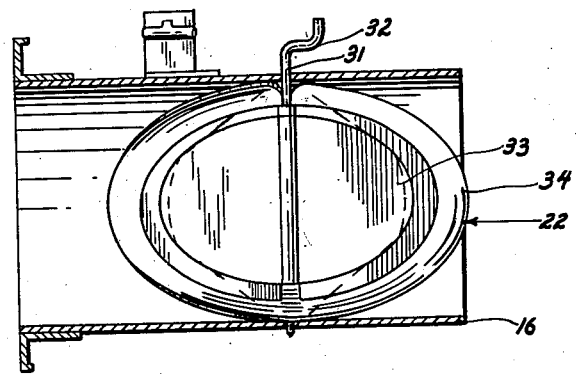
Figure 5 is an enlarged plan view of the butterfly valve.
Figure 6:
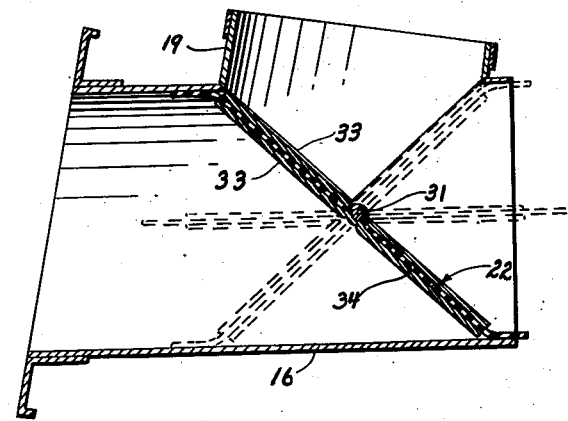
Figure 6 is an enlarged horizontal section of the butterfly valve.

Figures 5 and 6 are respectively an enlarged plan view and an enlarged horizontal section of the butterfly valve. The butterfly valve 16 consists of a sheet steel body to which is attached a sheet steel side arm 19 and a butterfly 22 which in turn comprises two complementary sheet metal ellipses 33 enclosing an elliptical rubber gasket 34, the whole assembly being pivoted upon rod 31 which is actuated by a Bowden wire (not shown) operating upon crank 32. It will be observed that the rubber gasket 34 is at all times larger than the corresponding dimension of butterfly valve 16. Due to this enlargement of rubber gasket 34, a tight seal is effected between the butterfly 22 and the butterfly valve 16 when in either closed positions. In addition to serving to tightly seal the butterfly valve in the closed position, this rubber gasket material 34 by virtue of having its minor axis larger than the diameter of butterfly valve 16 serves to impart an over-center action to butterfly 22 so that it will automatically seat in either closed position and remain so without the application of any external pressure. It is thought that this over-center action will be apparent from a careful study of the position assumed by this rubber gasket in Figure 5 in the area immediately adjacent the crank end of the rod 31 where it passes through the body of the butterfly valve. While it has not been so illustrated in the drawing, it is apparent that a similar butterfly can be mounted in the left-hand butterfly valve to control the flow of fresh air through the left-hand conduit 14.

With the structure described above, the operator of the vehicle has under his upper control a flow of fresh air at all times while the car is in motion through the left-hand conduit 14, butterfly valve 16, and deflector 18.

Through the right-hand conduit 14 and butterfly 16, he may have at his election a supply of fresh unheated air, a supply of fresh heated air, a complete exclusion of fresh air and the recirculation of heated air to the passenger compartment or any intermediate combination of recirculated and fresh air. This structure also provides an independent control of the defrosting mechanism and an adjustable thermostatic control whereby the operator of the vehicle may select a temperature comfortable to him.

I claim as my invention:

In a motor vehicle, a heating system comprising an impact air conduit leading from a forward position on the vehicle and discharging directly into the passenger compartment, a branch conduit located intermediate the ends of the impact air conduit and terminating in a blower mechanism, a three-way valve at the intersection of the impact air conduit and the branch conduit, said three way valve comprising an approximately elliptically shaped rigid member whose minor axis is approximately the diameter of the impact air conduit and which supports a thin elastomer gasket member which extends significantly beyond the limits of said rigid member at least in the vicinity of the minor axis whereby an over center locking action is obtained which will secure said rigid member in either of its extreme positions, a heater connected to said blower mechanism and a heat distributing means adapted to distribute in the passenger compartment air passing through the blower and heater.

HAROLD V. JOYCE.

REFERENCES CITED

The following references are of record in the file of this patent:

UNITED STATES PATENTS

| Number | Name | Date |
| --- | --- | --- |
| 2,131,017 | Lintern et al. | Sept. 20, 1938 |
| 2,213,018 | Perkins | Aug. 27, 1940 |
| 2,225,071 | Meyerhoefer | Dec. 17, 1940 |
| 2,325,427 | Reynolds | July 27, 1943 |
| 2,391,408 | Galamb et al. | Dec. 25, 1945 |
| 2,532,486 | Fairbanks | Dec. 5, 1950 |